United States Patent
Carkner et al.

(10) Patent No.: US 8,237,408 B2
(45) Date of Patent: Aug. 7, 2012

(54) SYSTEM AND METHOD OF LIMITING DEGRADATION OF THE BATTERY BY PROHIBITING OVER-CHARGE WITH MEASURED TEMPERATURES

(76) Inventors: Steve Carkner, Ottawa (CA); Paul Jan Melichar, Lee's Summit, MO (US); Joon Kim, Lee's Summit, MO (US)

(*) Notice: Subject to any disclaimer, the term of this patent is extended or adjusted under 35 U.S.C. 154(b) by 344 days.

(21) Appl. No.: 12/692,568

(22) Filed: Jan. 22, 2010

(65) Prior Publication Data

US 2010/0188053 A1 Jul. 29, 2010

Related U.S. Application Data

(60) Provisional application No. 61/147,124, filed on Jan. 25, 2009.

(51) Int. Cl.
H02J 7/00 (2006.01)
H02J 7/04 (2006.01)
H02J 7/16 (2006.01)
G01N 27/27 (2006.01)
H02J 7/06 (2006.01)
H02J 7/24 (2006.01)

(52) U.S. Cl. ........ 320/132; 320/131; 320/137; 320/150; 320/154; 320/157; 320/160; 320/162; 324/431; 324/432

(58) Field of Classification Search ............. 320/131, 320/132, 137, 150, 152, 154, 157, 160, 162; 324/431, 432
See application file for complete search history.

(56) References Cited

U.S. PATENT DOCUMENTS

| | | | |
|---|---|---|---|
| 7,489,108 B2* | 2/2009 | Matsumoto et al. | 320/132 |
| 2005/0073282 A1* | 4/2005 | Carrier et al. | 320/106 |
| 2006/0152196 A1* | 7/2006 | Matsumoto et al. | 320/132 |
| 2009/0153104 A1* | 6/2009 | Matsuura et al. | 320/153 |
| 2010/0270974 A1* | 10/2010 | Sakakibara | 320/132 |

* cited by examiner

*Primary Examiner* — Yalkew Fantu
*Assistant Examiner* — Steve T Chung
(74) *Attorney, Agent, or Firm* — Gordon Thomson (57) ABSTRACT

A battery charging apparatus and method adapted to reduce battery capacity as a function of increased temperature thereby permitting partial charges at temperatures in excess of manufacturer's recommendations. The method includes steps of reducing charging current and charging voltage as a function of battery temperature thereby averting chemical instability within the battery. The apparatus detects battery temperature and includes a controller that will control charger voltage and current as a function of temperature and determine a suitable charging capacity.

15 Claims, 6 Drawing Sheets

SYSTEM AND METHOD OF LIMITING DEGRADATION OF THE BATTERY BY PROHIBITING OVER-CHARGE WITH MEASURED TEMPERATURES

CROSS-REFERENCES TO PREVIOUSLY FILED APPLICATIONS

This patent application claims the benefit of U.S. Provisional Patent Application No. 61/147,124 filed on Jan. 25, 2009.

BACKGROUND OF THE INVENTION

Rechargeable lithium batteries can be constructed from a number of different materials including cobalt, nickel, manganese, phosphorous and iron. Each chemical combination has thermal limitations on both charging and discharging.

When discharging a battery, chemical reactions take place inside the battery that release electrical energy. In a rechargeable battery, these reactions can be reversed by application of electrical energy to the battery. The ability of the chemistry to be reversed without a loss of battery storage capacity is largely dependent on minimizing any unwanted chemical reactions that occur which bind the chemicals in the battery in irrecoverable ways. These unwanted reactions are called side reactions and they are the principal cause of battery degradation as the number of charge/discharge battery cycles increases.

In the case of low temperatures, the ability of the batteries to discharge is limited mainly by the speed of the chemical reactions that can occur. Generally, when a cold battery is overloaded, the voltage at the terminals will fall which naturally self-limits the battery in a safe manner.

In the case of low temperature charging, the speed at which the chemical reaction can be reversed is also slowed. Generally when a cold battery is charged too quickly the voltage at the terminals will rise causing the charging system to assume the battery is full, alternatively most charging systems will sense battery temperature and will reduce charging speed for a cold battery to ensure the battery is not charged too rapidly. Self heating of the battery may also help to improve charge acceptance for a cold battery.

In the case of high temperatures, the ability of the batteries to discharge is enhanced as the chemical reactions can occur quickly. Generally, when a hot battery is discharged, no damage will occur to the battery provided such discharge occurs at a rate that would normally be considered acceptable. The materials that makeup a lithium battery are somewhat dangerous if they are made very hot, for this reason the maximum discharge temperature for lithium batteries may be limited from a perspective of safety rather than damage.

In the case of high temperature charging, the battery will freely accept charge current at high temperatures. However, in this situation, the number of unwanted side reactions increases dramatically, causing irrecoverable damage to the battery. The approximate magnitude of these side reactions will double in magnitude for every 10 degree centigrade rise in temperature. It is therefore expected that a battery rated for 1000 charge/discharge cycles at a maximum temperature of 40 degrees centigrade would only achieve about 500 cycles at 50 degrees centigrade and about 125 cycles at 70 degrees centigrade. The majority of the cycle by cycle damage to the battery occurs during charging under these high temperature conditions.

The above limitations of temperature has generally resulted in lithium battery manufacturers providing a narrower acceptable temperature range for charging than for discharging. For example, lithium cobalt rechargeable batteries may be rated from 0 to +40 degrees centigrade for charging, but have a wider range of −20 to +70 degrees for discharging.

The ability to charge the batteries at lower temperatures is being addressed by charging systems that apply external heaters, or by reducing charge current into the batteries when they are very cold.

There exists a need for a method of charging that can reduce damage to batteries when charging at high temperatures.

SUMMARY OF THE INVENTION

In a preferred embodiment of the invention there is provided a means for measuring the temperature of the battery system that is to be charged. There is further provided at least one of several means of reducing unwanted side reactions from occurring in the battery chemistry through the new methods of charge control provided herein.

Unwanted side chemical reactions occur during the entire period the battery is charging. The rate of these unwanted side reactions increases dramatically with temperature and can be responsible for the irreversible loss of battery capacity that is experienced when the battery is cycled.

The magnitude of the reactions is also dependent on the voltage of the battery cells as high voltages tend to produce chemicals of significantly higher volatility and these chemicals will therefore have a higher affinity to enter into unwanted reactions.

There are therefore three main contributors to the magnitude of the unwanted reactions in a rechargeable battery: high temperatures, high voltages and duration of charging.

A first preferred method of charging controls only the end charging voltage such that the battery experiences a normal charging cycle, with the end-of-charge voltage being reduced at elevated temperatures. The method of changing the charging voltage with temperature has been applied in other chemical technologies such as lead-acid batteries because those chemistries actually reach a full charged state at different voltage levels depending on temperature. This is not the case with Lithium rechargeable batteries. In the case of lithium batteries, the full charge voltage is not affected by temperature, and therefore reducing the charge voltage will result in the lithium battery not reaching a fully charged state. For example, on a per-cell basis for lithium cobalt, reducing the charge voltage from 4.2 volts to 4.1 volts results in the battery being about 90% charged when charging is terminated.

The disadvantage of controlling only the charging voltage is the duration of charging is still quite long due to a region of charging known as taper-charge.

A different method of charge control that is unique to lithium technologies would be to modify or possibly eliminate the taper charging region. This method will result in the batteries being charged to nearly full capacity and directly reduces the total charge time. The battery charge voltage is unchanged, the reduction in battery degradation is therefore more modest. This method may be most appropriate at temperatures that are only slightly elevated above normal.

The preferred embodiment would combine the methods of reducing or eliminating taper-charge as a first step followed by reduction of charging voltage at more extreme temperatures. For charger systems that are designed to accommodate multiple chemistries, the reduction of charging voltage may be communicated by the battery itself, or may be adjusted based only on the full charge voltage for that particular chemistry. For example, Lithium Cobalt may utilize a full charge voltage of 4.2 volts, while Lithium Iron may use a full charge voltage of 3.6 volts. The final charging voltage at an elevated temperature of 60 C may therefore be 4.0 volts for Lithium Cobalt, but be only 3.4 volts for Lithium Iron while still satisfying the intent of the reduction of total charging capacity at high temperatures.

A second preferred embodiment would limit only the charge percentage based on capacity monitoring of the battery. In this case charge would be terminated when the battery reached a specific recharge percentage, such percentage would be reduced as temperature increased. For example, the battery may be allowed to recharge to 100% at temperatures less than 50 C, but may be limited to 90% at 60 C and 80% at 65 C.

DETAILED DESCRIPTION

Figure 1:
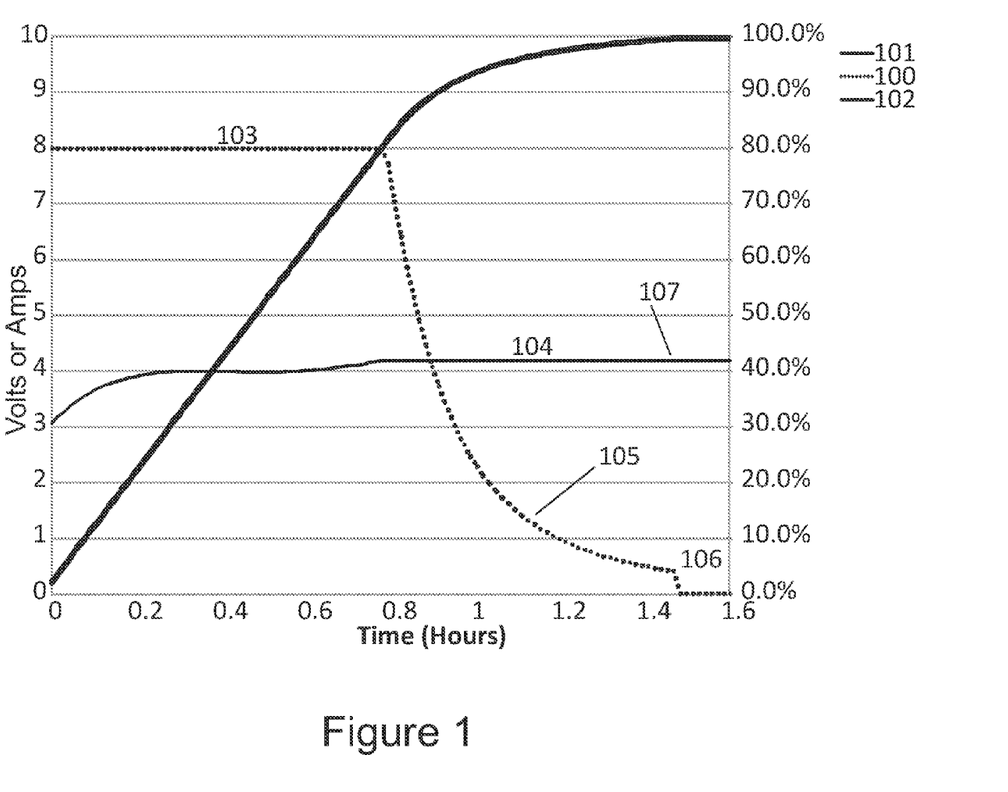
FIG. 1 is a graph of standard lithium battery recharging.

Referring to FIG. 1, lithium batteries are usually charged with a method called CCCV, this refers to Constant Current Constant Voltage. A fully discharged lithium battery will start with a fixed level of charging current. This current is chosen based on the manufacturer's recommendations, or the power limits of the charge system itself due to size, heat dissipation and available power sources. An optimal rate of charging is usually 1 C, where C is the capacity of the battery. Hence an 8 amp-hour battery will often be charged with a fixed current of 8 amps. The graph shows charging current (100), cell voltage (101) and approximate cell capacity (102). When charged at a 1 C rate, the battery will generally reach about 80% of full charge capacity at the point where the individual cells reach about 4.2 volts. The region of charging with a fixed current is called the Constant Current region (103). For lithium cobalt technologies, a cell voltage of 4.2 volts represents the highest voltage most batteries are charged to. If voltage is increased beyond this point the battery chemistry can become unstable resulting in damage to the cells and potential safety issues. Different chemistries have different rated charge voltages, for simplicity we will focus on only lithium cobalt cells. At the point where the individual cells reach 4.2 volts, the charging system will enter the constant voltage stage of charging (104).

During constant voltage charging (104) the battery is held at a fixed voltage and the current gradually falls. The battery is considered fully charged when the current falls to a charge current termination threshold (106) as defined by the manufacturer, generally C/20. For an 8 amp-hour battery this would be a current of 400 milli-amps. The curve showing the current dropping from C rate to C/20 is referred to as the current-taper (105) and may take as long to complete as the constant current portion of the battery charging cycle. The cell voltage (101) may drop slightly (107) when charging is terminated due to the internal cell resistance, it is expected that the charging system will have some level of hysteresis built into to prevent oscillation due to this drop in voltage. If the battery is charged at a lower fixed current, the constant current charging region (103) will get longer and the current taper region (105) will get slightly shorter. Similarly, at higher charge rates the battery will spend less time in constant current mode and more time in the current taper region.

Figure 2:
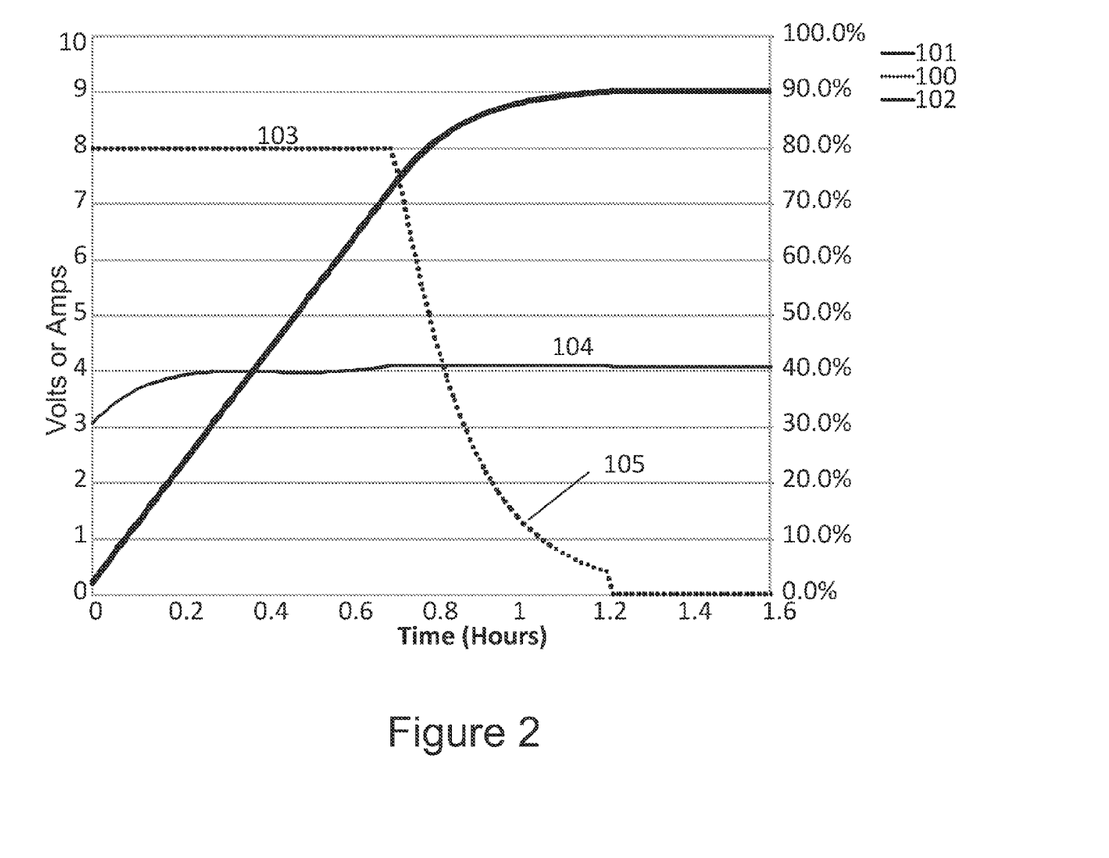
FIG. 2 is a graph showing a reduction in charging voltage.

FIG. 2 shows a graph of battery charging when only the fixed battery charging voltage (101) is reduced. This causes a decrease in the amount of time the battery spends charging in the constant current region (103) because the battery reaches this lower voltage point faster (assuming the charging current is left unchanged from FIG. 1). The time spent in current taper (105) will also tend to drop off slightly faster. The overall charge time and therefore the overall charge capacity (102) is also reduced, the battery will not achieve 100% charge.

Charging with this method will reduce the damage caused by unwanted side chemical reactions that tend to occur faster at higher cell voltages. Since the total time spent charging the batteries is also shortened, the degradation due to side reactions, irrespective of voltage (those reactions that occur during charging at all cell voltages), will also be moderately improved. It is estimated that lithium cobalt technologies will experience almost double their cycle life at high temperatures when charged at 1 C with a 0.1 volt per cell reduction in charging voltage. Other chemistries, charge currents and charging voltages will result in different improvement levels.

Figure 3:
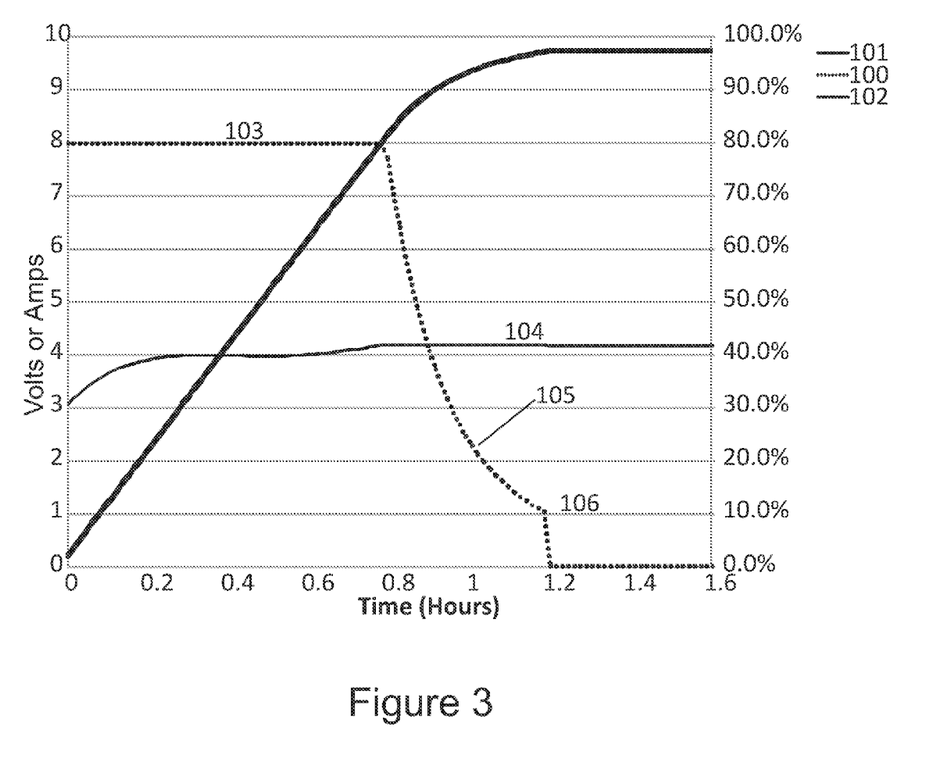
FIG. 3 is a graph showing a reduction in charging taper region.

FIG. 3 shows a standard charging graph where only the charge current termination threshold (106) is increased at higher temperatures, in this case, for example only, the threshold is increased from 400 milli-amps to 1000 milli-amps. This threshold could be increased proportionally with temperature, or it could be increased in a step function for specific temperature ranges.

This increase in termination threshold results in a direct decrease in the amount of time spent recharging the battery in the taper current region. Since there is very little energy being delivered to the battery in this region, the actual impact on battery capacity is small. This method reduces the damage caused by side reactions at high cell voltages since the taper charging region only occurs when the cells have reached their highest voltage. The majority of cell damage occurs when cell voltages are high, therefore, reducing the time spent in the current taper region will give a larger benefit with respect to cell damage with a smaller sacrifice of charge capacity. A further advantage of this method is that it can be gradually applied as temperature rises, and therefore allows a user to get nearly 100% charge into a battery that is only a little hotter than normal, with capacity smoothly reducing as the threshold (and the temperature) rises.

Figure 4:
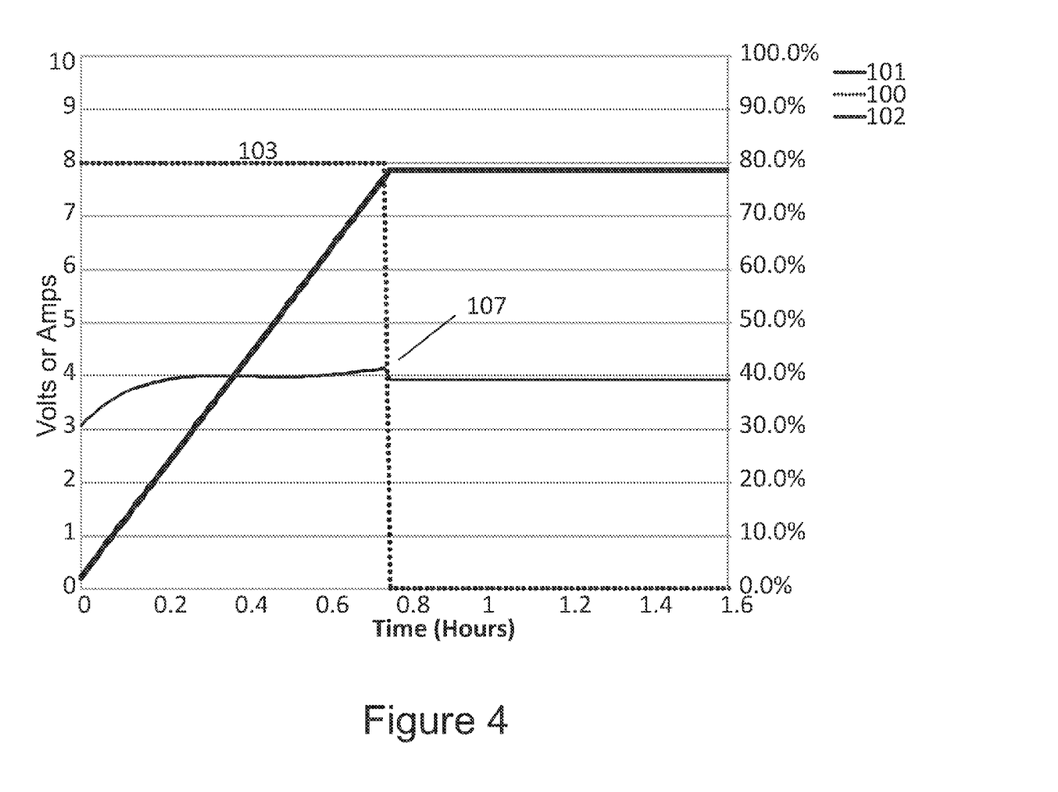
FIG. 4 is a graph showing a reduction in charging voltage with no taper region.

FIG. 4 is a graph showing a preferred embodiment where the battery charge current threshold has been increased to the point where the taper region no longer exists, instead current (100) drops from the full rate to zero in a single step function, in addition the cell voltage (101) to which the charger is allowed to operate at is also reduced. This causes charging to terminate before the battery completes the Constant Current region (103) of charging. It is expected that this battery is very hot and therefore a reduction in full charge capacity to around 80% would be acceptable. It is also possible that the charging system would allow charging to re-start if the battery cools down.

Also referring to FIG. 4, the cell voltage (101) will experience a drop (107) at the point where the charging current is switched off. This is due to the internal cell impedance and is normal. The charging system must contain adequate hysteresis to ensure the battery does not oscillate in this region.

It is estimated that battery recharge temperatures could be increased to the same level as the rated discharge temperatures, with only a modest degradation in cycle life, provided this method of charge reduction is put in place. Using the methods presented in the preferred embodiment on their own will each provide some extension to the cycle life of the battery at high temperatures. Using the methods together, and by implementing each method to varying degrees as temperature increases, will ultimately reduce damage to the battery at high temperature and dramatically extend the operating ranges for rechargeable batteries.

It is expected with a 1 C charge rate, reducing charge voltage to 4.0 volts and elimination of the charge taper region will resulted in battery cycle life increasing from about 125 cycles at 70 degrees centigrade to over 1000 with an acceptable level of cycle by cycle charge capacity loss and overall irreversible capacity loss.

Figure 5:
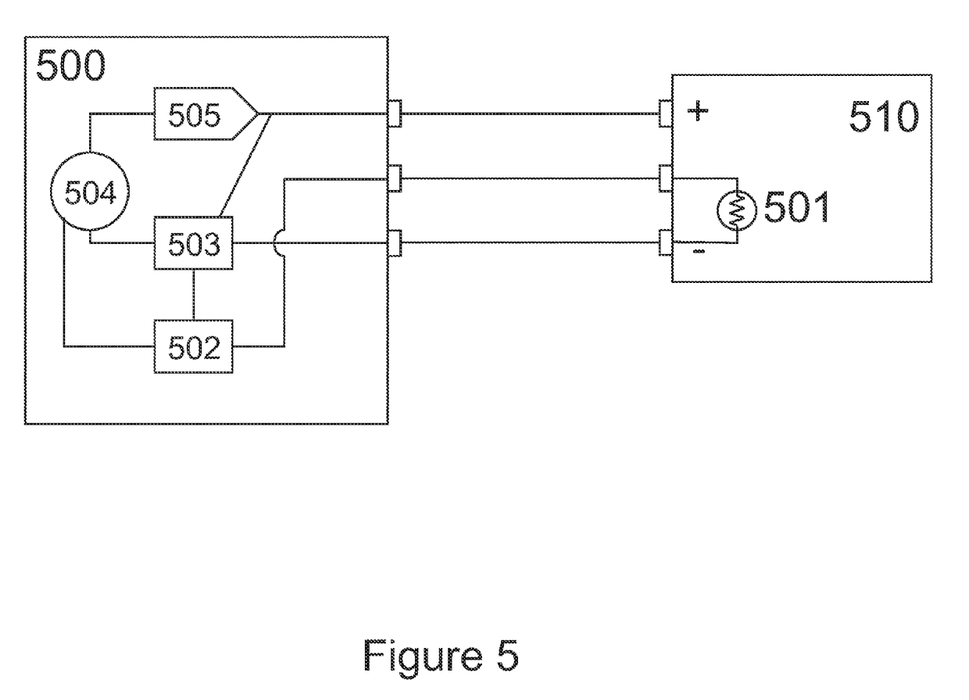
FIG. 5 is a block diagram of a charging system capable of reducing charging voltage or taper.

FIG. 5 shows a block diagram for an independent charging system (500) that is used to charge a battery (510). The charger contains a controller (502) which measures the battery temperature through a temperature sensor (501) which may be analog or digital in nature. The controller (502) uses an analog front end (503) to measure battery current and voltage and can in turn control the output voltage (504) and current (505) such that the battery (510) may be recharged with a variable charge current termination threshold and with variable charge voltage as appropriate based on testing and analysis of the best compromise between recharge capacity and cycle life.

Other analog style charge methods may contain fixed voltage or current sources and be capable of implementing the methods described through digital cutoff methods such as switching voltage between two set-points as opposed to implementing a full analog control scheme. As more points of control are implemented in the current termination threshold, the constant voltage and constant current controls, the system will approach an ideal, fully analog controlled implementation.

Figure 6:
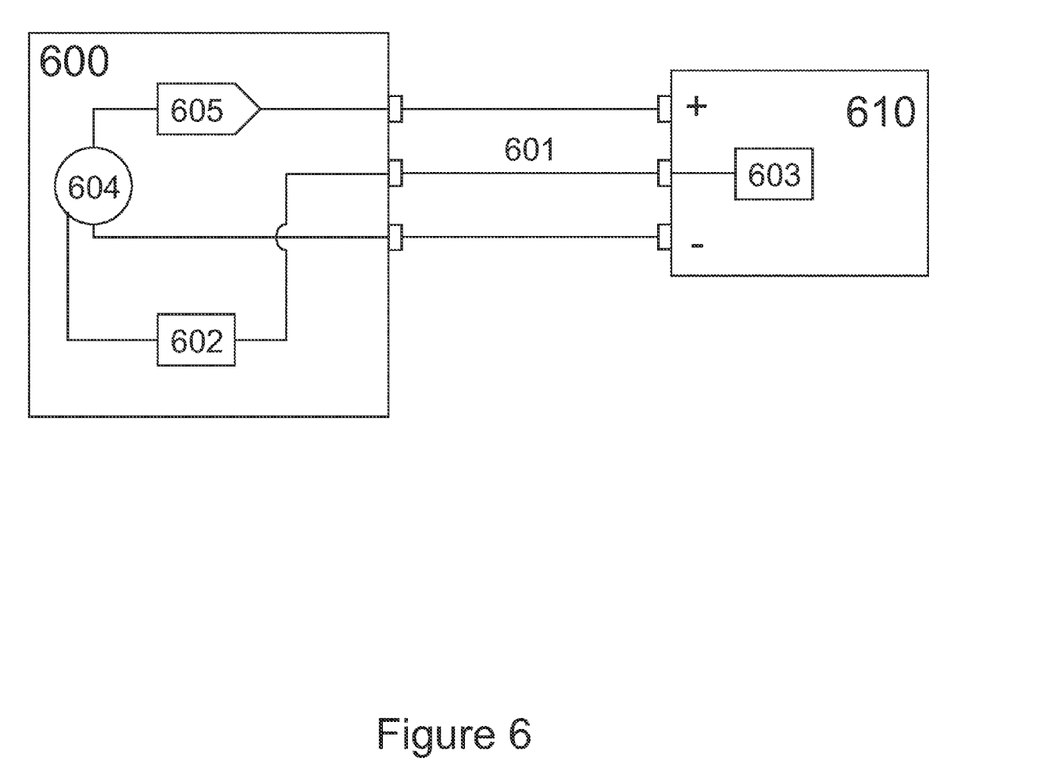
FIG. 6 is a block diagram of a charging system capable of reducing charging capacity.

FIG. 6 shows a block diagram of a more advanced smart charging system (600) that communicates with the battery (610) through a communication bus (601) to a battery controller system (603) located inside the battery pack. The battery will therefore report at a minimum the state of charge of the battery and the temperature of the battery through digital means. The charging system controller (602) can control charging using either voltage control (604) or current control (605) or alternatively a simple on/off switch (not shown) when the battery reaches a specific reported capacity, irrespective of voltage, current taper, or other parameters. This provides the simplest method of decreasing recharge capacity in a way that is related to temperature. The charger is expected to contain protection and safety circuitry as is appropriate for charge systems in the event that the battery fails to properly communicate parameters back to the charger.

For example only, the battery could be allowed to recharge to 100% at temperatures below 40 degrees centigrade, it could be allowed to recharge to a percentage of 100−(T−40), where T is the battery temperature, for temperatures above 40 degrees but below 70 degrees. For example, this could allow the battery to reach 90% charge at 50 degrees centigrade, 80% charge at a temperature of 60 degrees centigrade and 70% charge at 70 degrees centigrade. Charge could then be completely inhibited at a temperatures exceeding 70 degrees centigrade. This is one example of applying this method, appropriate levels of testing and research would be conducted on specific battery chemistries, chargers and applications to determine the appropriate compromise between recharge capacity, cycle life and recharge temperature range. The proportionality of charge capacity reduction may be linear in nature, or may have other specific mathematical significance such as an exponential or polynomial curve that in some way makes charge capacity decrease by a defined amount as temperature increases by a defined amount.

A smart battery could also implement the algorithms outlined with respect to voltage, current, threshold and total percentage charge reduction. Many smart charger systems will communicate digitally with the battery to be charged. The battery will tell the charger what parameters should be used for charging, including the constant current and constant voltage levels. The smart battery could communicate new voltage, current and termination levels as temperature changes. In this way the charger does not need to know the details of the battery chemistry and how said chemistry reacts to high temperatures. The manufacturer of the battery is therefore free to improve and modify their chemistry to operate at more extreme temperature conditions, and the charging system will then obey the new battery systems wishes for charging, therefore allowing new battery chemistries to potentially operate with higher total capacities at high temperatures as the science of the chemistry itself is improved.

Although the description above contains much specificity, these should not be construed as limiting the scope of the invention but as merely providing illustrations of the presently preferred embodiment of this invention. Thus the scope of the invention should be determined by the appended claims and their legal equivalents.

We claim:

1. A method for limiting degradation in a rechargeable battery during charging at an applied charging voltage and at elevated temperatures comprising the steps of: a) determining the temperature of said battery; b) calculating a percent reduction value for a suitable percent reduction in battery recharge capacity as a function of said battery temperature; c) reducing the recharge capacity of said battery by said percent reduction value to a lower recharge capacity; d) terminating charging at said lower recharge capacity; and, e) wherein the percent reduction value increases as the battery temperature increases.

2. The method of claim 1 further including the step of calculating a threshold temperature value at which to apply the percent reduction value.

3. The method of claim 1 wherein the step of calculating the percent reduction value is a function of said applied charging voltage so that a predetermined reduction in the applied charging voltage reduces recharge capacity by the percent reduction value.

4. The method of claim 1 wherein the battery temperature is less than 50 degrees C. and the recharge capacity is 100%.

5. The method of claim 1 wherein the battery temperature is 60 degrees C. and the recharge capacity is reduced to 90%.

6. The method of claim 1 wherein the battery temperature is 65 degrees C. and the recharge capacity is reduced to 80%.

7. A method for limiting degradation in a rechargeable battery during charging at a reduced charging voltage, at a constant charging current, over a charging period of time and at elevated temperatures comprising the steps of: a) providing a means for measuring said rechargeable battery temperature; b) measuring temperature of the battery; c) calculating a value for a suitable decrease in said charging voltage as a function of said temperature; and, d) applying said value to the charging voltage thereby reducing said charging period of time and charging capacity.

8. The method of claim 7 wherein said constant charging current has a termination threshold that is increased in magnitude as battery temperature is increased.

9. The method of claim 8 wherein said termination threshold is increased so that the constant charging current drops to zero when the recharge capacity reaches 80%.

10. The method of claim 7 wherein the reduction of recharge capacity is based on reported battery capacity which is digitally communicated to a charging system.

11. The method of claim 7 wherein the temperature is the manufacturer rated maximum recommended charging temperature of the battery system.

12. The method of claim 7 wherein the relationship between charge reduction amount and increase in temperature can be defined by an $n^{th}$ order polynomial equation.

13. The method of claim 7 wherein the relationship between charge reduction amount and increase in temperature can be defined by at least two discrete reduction values applied to at least two temperature ranges.

14. The method of claim 7 wherein the implementation of the reduction of recharge capacity is calculated by the battery itself and communicated to the charger.

15. A method for limiting degradation in a rechargeable lithium battery during charging at elevated temperatures comprising the steps of:
   a. Increasing battery charge current threshold to a first current value (I) proportional to battery temperature (T);
   b. Reducing cell voltage to a first voltage value (V) proportional to said battery temperature (T); and,
   c. Reducing charge capacity (C) to a value proportional to the battery temperature (T), wherein said value "C" can be computed by an algorithm: $C=100-(T-40)$.

* * * * *